Jan. 26, 1960     C. R. SACCHINI     2,922,220
METHOD OF PRODUCING A CLUTCH SPRING HAVING CONTROL COILS
Filed Feb. 9, 1953

INVENTOR.
C. R. SACCHINI
BY George M. Soule
ATTORNEY

United States Patent Office 2,922,220
Patented Jan. 26, 1960

2,922,220
METHOD OF PRODUCING A CLUTCH SPRING HAVING CONTROL COILS

Columbus R. Sacchini, Willoughby, Ohio, assignor, by mesne assignments, to Curtiss-Wright Corporation, Marquette Metal Products Division, Cleveland, Ohio, a corporation of Delaware Application February 9, 1953, Serial No. 335,726

3 Claims. (Cl. 29—173)

The invention relates to a new and economical method of producing a helical torque transmitting friction spring having integral control coils, i.e. energizing or deenergizing coils of reduced cross section relative to the main coils of the spring. This application is a continuation-in-part of an application of C. R. Sacchini, Serial No. 252,890, filed October 24, 1951, entitled Coil or Spring Clutch Assembly and Method of Producing Clutch Springs, now abandoned, the same being owned by the assignee hereof.

Helical metal members of the type usually called clutch springs (may serve as brakes) are commonly wound or formed from metal spring stock of uniform cross section; and, in most cases, at least one coil at one end of the spring is suitably anchored to one of two members to be drivingly coupled by means of the spring, and coils at the opposite end, such as herein referred to as control coils, operate in frictional contact with a co-acting drum surface of the other member or with an energizing or deenergizing element associated therewith, to control the torque transmitting gripping action of the spring in various ways well known in the art. For example, and as shown herewith in Fig. 1, coaxial, relatively rotatable drums A' and B' are bridged or telescoped by main coils 15 of a helical spring C and gripped thereby (clutch locked; condition illustrated) whenever a control sleeve S, which is frictionally connected to the spring through control coils 10 thereof, is rendered free to rotate. When the control sleeve is prevented from rotating, then the main coils, through action of the control coils, become expanded so as to be out of torque-transmitting contact with at least one of the drums, unlocking the clutch. In other types of spring clutches, designed for example for silent ratchet or indexing operations, the control coils (commonly called "energizer" coils) are continuously in frictional contact with one of the drums and the clutch is caused thereby to be locked in consequence of attempted relative rotation of the drums in one direction and unlocked in consequence of opposite relative rotation.

In almost all cases it is desirable that the control coils shall be of smaller cross section, hence more flexible, than the main or load carrying coils and in many cases it is desirable that the control coils shall have their peripheral surfaces offset radially either inwardly or outwardly from the corresponding surfaces of the main coils, at least when all the coils are relaxed. The problems often involve interference on part of portions of the spring with other elements of the assembly, so that putting together of the clutch components is facilitated or made possible, as in the herewith illustrated clutch unit, by relative difference in coil height and effective diameters on part of the main and control coils. Various reasons involving proper or enhanced functioning of clutch units employing relatively large cross section load carrying coils and control coils of smaller cross sectional area, hence more flexible, are discussed in detail in various patents of W. C. Starkey, e.g. 1,932,000 and 1,983,824 published October 24, 1933 and December 11, 1934 (so called "teaser spring" patents). Under those patents the assignee hereof and its predecessors widely practiced manufacture of clutch spring assemblies comprising large cross section main coils and small cross section control or "teaser" coils rigidly secured in various ways to the main coils. There is no practical and economical previously known manner to my knowledge whereby a generally satisfactory clutch spring with both types of coils can be made in one piece from wire or spring stock of uniform cross section, and particularly no way in which such clutch springs can be so made economically in high quantity production and wherein the main and control coils are of generally similar cross section and merge gradually and smoothly into each other with no abrupt change in cross sectional area and with no steps on the individual coils.

The principal object hereof is to provide a new and practicable method of making one-piece clutch springs having the above indicated desirable characteristics.

Other objects of the invention will become apparent from the following description of the preferred procedure in making clutch springs with integral control coils.

In the accompanying drawing, Fig. 1 is an assembly view, partly in longitudinal central cross section, showing one form of spring clutch wherein the spring has control coils produced by the present method.

The invention is illustrated in connection with a "contracting type" spring clutch, that is one in which the main or load carrying coils contract to grip their coacting drum surface or surfaces and expand to release the same. The procedure, in carrying out the method, is essentially reversed in case the clutch design is of the "expanding type."

Figure 1:
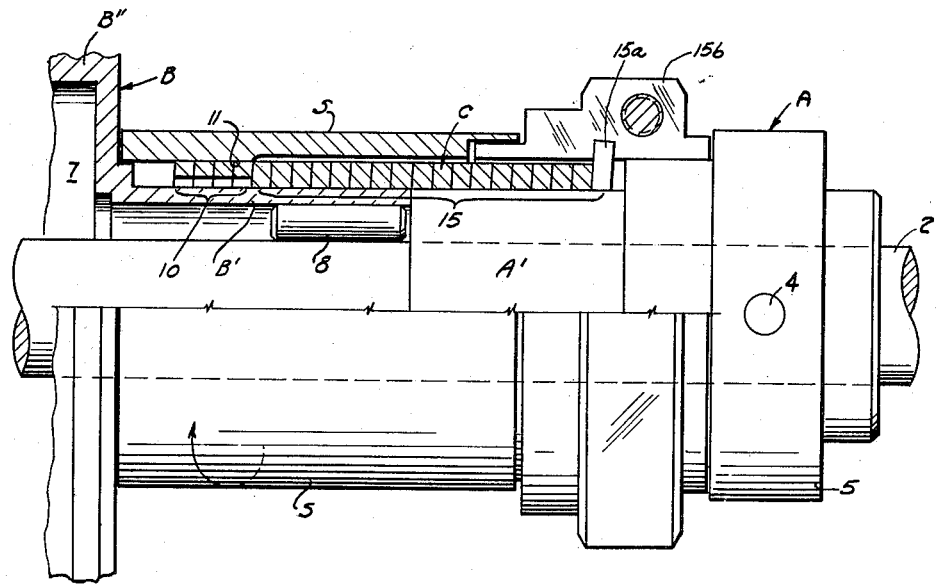

In Fig. 1 the clutch unit or assembly 1 is shown as supported on a shaft 2 which projects toward the left from a supporting mechanism (not shown), the various clutch components having to be assembled over the free end of the shaft without removing the shaft from the mechanism and secured in operating relationship. A driven or output member A of the assembly, which, as shown, includes an integral cylindrical clutch drum portion A', is secured to the shaft by a cross pin 4, in a head portion 5 of member A. A co-operating cylindrical driving clutch member B having a drum portion B' and an integral, input-receiving, driving wheel portion B" is slipped over the free (left) end of the shaft and secured in position, coaxially with drum member A, as by a suitable attaching collar. The driving member B is journalled on the shaft 2 through the intermediary of conventional bearings or bearing assemblies 7 and 8 for free rotation relative to the shaft. Wheel B" is assumed to be continually rotated, as by an electric motor (not shown), when operation is required of the clutch.

Bridging the driving and driven clutch drums A' and B', originally preloaded thereon (i.e. in interference fitting relation thereto), is the clutch spring C. The preloading enables rotation of the shaft 2 whenever the wheel B" is turned, as in the indicated direction (see arrow, Fig. 1), assuming the spring C is free to turn with the driving drum B and is free to grip the two drums. If the spring is restrained from turning at its control coil end portion 10, left, Fig. 1, as by a two-way-operating latching mechanism, not shown, engaging control sleeve 5 then no rotary motion can be transmitted from wheel B" to the shaft 2 through the spring. Transmission of torque from the wheel B" to the shaft occurs automatically in the indicated direction consequent upon release of such two-way-operating latching mechanism by suitable means as fully shown and described in the pending application.

The control coils 10, as shown, frictionally engage an internal drum surface portion 11 of the control sleeve S, through interference fitting contact with that drum surface or preloaded inside it. If generally the same clutch were to be employed to perform an ordinary indexing operation, then the control coils 10 would be of such inside diameter as to be preloaded on the drum portion B', i.e. expanded over that portion. A terminal main clutching coil or spring C is shown as anchored to drum member A as by a toe 15a on the spring secured to member A by an adjustable clamping collar 15b.

Figures 2, 3:
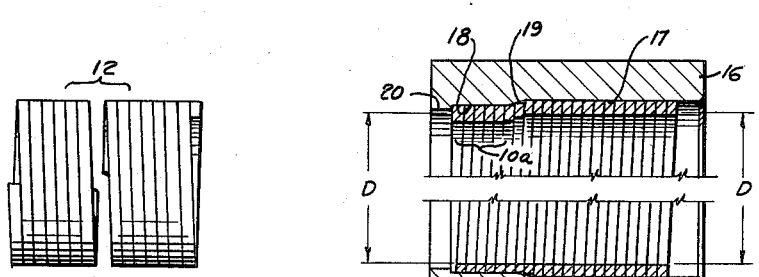
Fig. 2 is a fragmentary reduced scale, side elevation showing a coil blank as wound from uniform section wire or spring stock of generally rectangular form.
Fig. 3 is a central sectional, two part assembly view of a blank-receiving or mounting collet with the spring coil blank of Fig. 2 therein, top of view showing the blank as inserted into the collet; bottom showing the finished clutch spring, i.e. after a through, internal grinding or other finishing operation has been performed on the blank.

In Fig. 2 the clutch spring blank 12 is shown as a single cylindrical, close wound helical coil. To provide the control coils 10 thereon integral with the main coils 15, concentric therewith, of reduced cross section, as outlined above, and normally of larger external and internal diameters relative to the external and internal diameters respectively of the main coils, I proceed as follows:

The blank 12 (see upper half of Fig. 3) is forced into a solid sleeve or collet 16 (inside and outside concentric) having an internal diameter surface portion 17 preferably only sufficiently smaller than the outer peripheral surface of the blank 12 so that the coils which are to form the main clutching portions 15 of the spring will be snug in the collet. The coil portions of the blank which are to form the control coils 10 are forced by reduced diameter surface portion 18 of the collet (left Fig. 3) to be contracted a considerable amount relative to the main or load-carrying coil-forming portion of the blank 12. Surfaces 17 and 18 of the collet 16 are connected by a frusto-conical smooth shoulder 19 which, inter alia, acts as a cam to assist in forcing the control-coil-forming portions or coils of the blank 12 into place (right toward left) as will be apparent. An abrupt shoulder, forming a seat for axially locating the blank in the collet is preferably formed as an annular rib or flange 20 in the collet. Usually the blank 12 can be easily inserted into the collet 16, as by hand, snugly against the shoulder formed by rib 20, if the spring, during its insertion, is turned relative to the collet in the non-clutching direction. The difference in diameter of collet surfaces 17 and 18 is exaggerated in Fig. 3.

The blank is now internally ground or machined in a known or suitable manner, as on diameter D, to remove the inside periphery of the spring stock, for at least part of the length of the blank, as illustrated by the lower half of Fig. 3. For clutches such as illustrated, the load carrying coils are internally precision ground to the required size; and considerable time is saved by doing that simultaneously with cutting away the coils 10a. In other words, a single "through pass" grinding operation (light cut on coils 15) suffices to inside finish the main coils while removing the required amount of metal from the control coil forming stock. If metal is to be removed from only the coils 10a which form the control coils in the finished spring, then in order to obtain all available advantages, as will be further explained later, the cutting of coils 10a is done flush with the inner peripheral surfaces of the main coils as mounted in the collet.

In reference to inside diameter finishing or machining of the contracted control-coil-forming portions 10a of the blank, the depth of cut is predetermined (as by trial counterbore-forming or grinding of a spring of the desired main coil size) so that the amount of stock removed from the blank will relieve internal stresses, which have been trapped in the blank by coiling of it from generally straight stock, to the desired extent so that the finished spring will have the required shape, i.e. control coil diameter relative to main coil diameter. A two inch inside diameter spring of the proportions shown will, for example, expand approximately .007" if inside ground to 2.040" as described above. The amount of stock removed is usually limited to the sub-surface peripheral portion of the spring in which the metal has been strained beyond its elastic limit, since that is the portion which (in co-operation with the radially opposite peripheral portion of the spring which was oppositely strained beyond its elastic limit) controls the coil form. Thus, the removal of more than enough peripheral stock to produce a certain enlargement of outside coil diameter can have the opposite effect (outside diameter decrease). The procedure enables the choice of external diameters for the control coils within quite a large range, without having to change external peripheral surface characteristics of the coils.

Important advantages, particularly over the prior practice of forming main and control coils of a clutch spring by end-joining of relatively heavy and light gage wire, are: that the present method is much less costly; there is no sudden transition in cross sectional area, such as tends to cause spring breakage, but, instead a gradient merging of main coil section into control coil section, and all peripheral surface portions of the transition region (from main to control coils) are capable of being brought into full face contact with an associated drum surface, so that said region is not subjected to local twisting forces, and said peripheral surfaces have no steps of any kind. The gradient or transition portion between main and control coils can be relatively short or can be extended as far as desired. A short ramp or cam shoulder 19 of the collet 16 tends to produce a short transition portion of the spring. Thus a more durable clutch spring with integral control coils of reduced cross section can be made by providing a more gradual taper at 19 in the collet than as shown. Such further tends to facilitate insertion of the blank into place in the collet.

The manner in which reduction of control coil height (radial dimensions) relative to main coil height enables assembly of the spring C and its co-operating parts over one end only of shaft 2 is fully described in application Ser. No. 252,890, now abandoned. It may be of interest to note here, however (see Fig. 1), that if the coils 10 were to have the same height as coils 15 it would then be impossible to insert the drum B' into the control end of the spring C unless the spring were manufactured with its control coils of considerably larger mean diameter than the main coils and the control sleeve inner surface 11 were to be made with a correspondingly larger diameter than as illustrated. That would result in a more expensive construction than is necessary and, among other disadvantages which do not require consideration in this case, the control coils, through lack of flexibility would not be easy to insert into the control sleeve during the assembly of the clutch and would not be as certain to mate the surface 11 all around it if the coils happened to be slightly non-circular.

Figure 4:
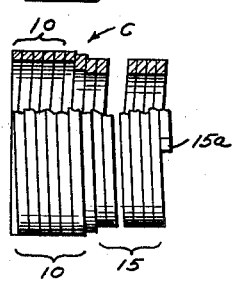
Fig. 4 is a fragmentary partly sectional view showing the main and control coils of the finished spring after it has been removed from the collet (all coils relaxed).

It was mentioned earlier herein that the illustrated method can, in effect, be reversed for use with expanding type spring clutches. An example of such reversal would be to mount the blank 12 of Fig. 3 on and around an arbor (not shown) of generally cylindrical form having an enlarged diameter portion in the region which is designed to support the control-coil-forming portion of the blank, corresponding to coils 10a, Fig. 3. In such case external, e.g. centerless, grinding of the blank at the control coil forming portion or for its full length and to the proper depth at the control coil portion would, upon removal of the spring from the arbor, result in a clutch spring with non-stepped, reduced section integral control coils of less inside diameter than that of the main coils (i.e. the reverse of the construction shown by Fig. 4 hereof).

Since the present clutch spring forming method always results in obtaining reduced section control coils which merge gradually and smoothly into the relatively larger section load carrying coils (no steps), the control coils can, by simple and inexpensive treatment subsequent to that described, as by heat setting on or in preformed arbors, sleeves or pockets, be modified so as to have either external or internal properly shaped friction control coil surfaces radially offset from the main friction surfaces of the spring any required distance in some cases and flush therewith in others. The absence of steps on the individual coils (such as would be formed on at least one coil by counterboring one end of the blank 12 from the control coil end while the blank is supported in a wholly cylindrical sleeve or collet) is therefore important from the standpoint of avoiding abrupt change in coil form (tendency to start coil fractures) as well as from the standpoint of providing proper friction peripheries on all portions of all of the coils. It will be apparent that the inside of a coil having a step along it would be unsatisfactory for clutching contact with an external drum principally because the coil would be twisted under the imposed clutching forces.

I claim:

1. The method of producing a helical torque transmitting friction spring from a single elongated piece of metal stock of uniform cross section and so as to have a main approximately cylindrical coil portion of one cross section and an approximately cylindrical control coil portion integral therewith and of reduced cross section radially of the coil, comprising: coiling the stock to form an approximately cylindrical helical blank, forcibly supporting main and control coil forming portions of the blank on respective approximately cylindrical peripheral surface portions as of an arbor or collet which portions are of relatively different diameters, removing metal from the control coil forming portions of the blank and from the coil portion lying intermediately of the principal main and control coil portions, all around the blank while so supported, to an extent such that the control coils will have reduced radial dimensions relative to the corresponding dimensions of the main coil forming portions of the blank and also a main and control coil connecting unstepped coil portion capable of full-face peripheral contact with an approximately cylindrical drum surface and of gradually changing radial dimensions, and removing the finished spring from the supporting surfaces.

2. The method according to claim 1 wherein all the peripheral surfaces of the blank lying opposite respective surfaces are cut away flush with each other while the coils are supported on said surfaces.

3. The method according to claim 1, wherein the cylindrical surface portions of relatively different diameters are axially spaced apart, and, between those surface portions, a coil portion of the blank is supported by a surface which converges in one direction axially of the blank, whereby a longer transitional coil of gradually varying radial dimensions is produced than without such convergent surface support, as in case the cylindrical surface portions are connected by an abrupt shoulder.

References Cited in the file of this patent

UNITED STATES PATENTS

| | | |
|---|---|---|
| 1,935,147 | Drexler | Nov. 14, 1933 |
| 1,962,219 | Starkey | June 12, 1934 |
| 2,043,695 | Brownlee | June 9, 1936 |
| 2,668,347 | Gorske | Feb. 8, 1949 |
| 2,521,670 | Starkey et al. | Sept. 5, 1950 |